Patented Jan. 1, 1952

2,581,111

UNITED STATES PATENT OFFICE 2,581,111

PROTEIN ADHESIVES CONTAINING DICYANDIAMIDE COMPOUNDS AS FLUIDIZING AGENTS

Chester G. Landes, New Canaan, and John Studeny, Stamford, Conn., assignors to American Cyanamid Company, New York, N. Y., a corporation of Maine No Drawing. Application September 22, 1948, Serial No. 50,656

11 Claims. (Cl. 106—146)

This invention relates to proteinaceous adhesives and relates more particularly to proteinaceous adhesive, sizing and coating compositions containing an agent which serves to impart thereto greatly improved fluidity and stability while not altering the desirable adhesive characteristics of such compositions.

Adhesive and sizing compositions in which alkali-solubilized proteins constitute the principal adhesive agent are in wide commercial use for such purposes as bonding together sheets of paper or board, wood plies, textile sheets and the like and as sizes for paper, textiles, etc. In these compositions a protein is used which forms a water-soluble or water-dispersible alkali metal or ammonium salt, the most common being casein and vegetable proteins such as corn protein (zein), wheat protein (gliadin), barley protein (hordein), and soya protein, the principal constituent of which is glycinin. Ordinarily the protein is dispersed in a water solution of the solubilizing alkali, with or without the aid of organic solvents such as ethanol or dispersing agents such as rosin soaps and the like, and the resulting dispersions are employed directly as liquid adhesives or sizes.

Aqueous alkaline protein dispersions which are employed as adhesives usually contain from about 10% to 35% of solids of which the protein comprises the major portion. Where the dispersions are to be employed as sizing compositions, the content of protein solids usually is from 1% to 10% of the weight of the dispersions. Similarly, in coating compositions for incorporating fillers in paper, textiles, etc., from 1% to about 15% of protein is present in the coating mixture.

On the other hand, casein and soya proteins have been used extensively in the preparation of dry adhesive mixes. In these compositions the protein material is dry mixed with varying proportions of alkaline agents which aid in dispersing or solubilizing the protein in water. Such alkaline agents as sodium hydroxide, potassium hydroxide, ammonium hydroxide, and similar alkaline agents consisting of monovalent ions are commonly employed for this purpose. Also included in the dry adhesive mix is an alkali containing a polyvalent metal such as, for example, calcium hydroxide. The heavy metal alkaline material serves to precipitate the protein from solution or dispersion and imparts to the adhesive, when dispersed in water, relatively quick setting properties.

Heretofore, various disadvantages have attended the use of protein adhesives. In the use of liquid protein adhesives, it has been impracticable to employ more than about 25–35% of protein based on the total mix because of the quick-gelling nature of these adhesives. For this reason, it has been the custom to prepare an aqueous alkaline protein adhesive containing from 10–25% of protein and to use the composition as quickly as possible to avoid waste through gelling thereof. The same is true of protein sizing compositions.

In coating compositions containing casein, soya protein, wheat protein, peanut protein, zein, or the like, it has been impossible to obtain smooth flowing properties in coatings containing more than about 10–15% of protein solids. The art has recognized this as a problem which is always attendant upon the use of thixotropic substances. The ease of brush, knife, or roll application of thixotropic materials varies considerably with their viscosities in liquid carriers and, as regards protein coating compositions, the aforestated quantities represent the practical upper limits permissible of use in the commercially accepted equipment. It will be seen that the use of such relatively small amounts of protein in coating compositions necessitated the evaporation of large amounts of water from the coated materials, thus adding materially to the cost of coated paper and textiles.

In regard to the dry protein adhesive mixes, it has heretofore been impracticable to employ aqueous dispersions thereof containing more than about 25% of protein due to the quick setting characteristics imparted thereto by the polyvalent metal alkaline materials, and the short working life of these adhesives has been a major disadvantages in the use thereof.

We have discovered that protein adhesives and sizes may be rendered less viscous in aqueous dispersion and stabilized against premature gelling by the addition thereto of small amounts of compounds having the general formula $$R.NH.\overset{\overset{\displaystyle NH}{\|}}{C}.NH.CN$$

wherein R may represent either hydrogen, alkyl radicals containing from 1-4 carbon atoms, or monohydroxyalkyl radicals containing from 2-4 carbon atoms. Representative examples of members of this group include dicyandiamide, isopropyl-, n-butyl-, isobutyl-, and monethylol- and isopropylol dicyandiamide, and the like compounds. This group of compounds has in common the characteristic of existing as solid materials which are relatively water-soluble, as well as being soluble in aqueous protein dispersions and solutions, and the compounds are also stable in aqueous alkaline solution. It will be seen that the members of our preferred group of fluidifying agents may be admixed in dry condition with protein adhesive compositions, or they may be added to aqueous protein adhesives. Furthermore the incorporation of our novel fluidifying agents in protein-containing coating compositions permits the use of larger amounts of protein and other solids, thus minimizing the amount of water to be evaporated from the treated materials.

The amounts of our fluidifying agents which may be satisfactorily employed are within the range of from about 5% to about 20-30% based on the weight of the particular dry proteinaceous compound used. Greater amounts of the fluidifying agents may be employed if desired although for commercial practicability quantities greater than about 30% of our fluidifying agents will not ordinarily be used.

In its broadest aspect, our invention comprises the preparation of protein adhesive and sizing compositions which are characterized by initial viscosities, when in aqueous condition, which are much lower than the viscosities of similar adhesives heretofore employed by the art. The decreased viscosities are imparted to our improved protein adhesives by the presence therein of from about 5% to about 20-30% of any of the above-described fluidifying agents. Our novel fluidifying agents may be added to the dry protein adhesive compositions by simply dry-mixing the components of the mix. The dry composition may be stored indefinitely without deterioration and may thereafter be dispersed in water and applied according to well known procedures. On the other hand, our novel fluidifying agents may equally as well be added to aqueous protein adhesive, sizing, and coating compositions and they may thereafter be employed according to known methods.

The primary advantage to be derived from the present invention resides in the fact that our novel protein adhesive, sizing, and coating compositions remain fluid and usable in aqueous condition for exceptionally long periods of time. Those compositions of relatively low protein content, such as 5-10%, are stabilized against thickening, while the rate of gelation is greatly reduced in adhesives having a higher content of protein, such as 10-40% or more.

Another advantage of the present invention is that the presence of our novel fluidifying agents in the adhesive, sizing, and coating compositions permits the preparation of aqueous adhesives containing up to about 40-50% of protein in contrast to the previous upper commercial limit of about 20-25% of protein.

A further advantage of our invention is that, due to the fact that all of our novel fluidifying agents are solid compounds, it is possible to prepare dry protein adhesive compositions which when dispersed in water remain fluid and usable for long periods of time.

The following examples are presented to more fully explain our invention. It is to be understood, however, that the examples are given primarily for illustrative purposes and that other embodiments of the invention may be employed within the scope of the appended claims.

Example 1

Twenty grams of dicyandiamide were dissolved in 283 grams of water and 107 grams of commercial acid precipitated casein (94.44% casein) was added to the solution. After soaking for about 15 minutes, 14 grams of ammonium hydroxide (28.42% $NH_3$) was added after which the dispersion was heated to 93° F. on a water bath while the mixture was continually stirred. The so-obtained liquid casein adhesive contained approximately 25% of casein solids. This product had an initial Brookfield viscosity of 2720 centipoises at 30 R. P. M. After aging for 24 hours at 72° F., the adhesive composition had a viscosity of 8000 centipoises, and after 10 days the adhesive was still pourable. A control sample which was similarly prepared but which contained no fluidifying agent had an initial viscosity greater than 100,000 centipoises and gelled upon aging for 24 hours at 72° F.

Example 2

The procedure of Example 1 was repeated except that the adhesive composition contained about 33.3% of casein solids, and 30 grams of dicyandiamide were employed. The initial viscosity of the fluidified adhesive was 38,000 centipoises while that of a control sample containing no dicyandiamide had an initial viscosity of greater than 100,000 centipoises. While the adhesive containing the dicyandiamide remained fluid for 10 days, the control sample became an unpourable gel within 3 days.

Example 3

A dry casein adhesive mixture was prepared by mixing 70 grams of commercial acid precipitated casein, 4 grams of silica powder, 6 grams of $Na_2CO_3$, 10 grams of sodium metasilicate, 5 grams of sodium fluoride, and 5 grams of $Ca(OH)_2$. The dry materials were mixed in a mortar without grinding. Twenty grams of this dry mix were dispersed in 45 grams of water. The material had an initial Brookfield viscosity of 14,000 centipoises at 6 R. P. M.

1.4 grams of solid ethylol dicyandiamide were mixed with a 20 gram portion of the above-described dry mix and this material was thereafter dispersed in 45 grams of water. The dispersion had an initial Brookfield viscosity of 2920 at 6 R. P. M.

Example 4

Urea has previously been suggested as a fluidifying agent for proteinaceous adhesives. In order to contrast the fluidifying effect of urea and the novel fluidifying agents of the present invention on such adhesive compositions, the following dry adhesive mixes were prepared. Seventy grams of commercial casein, 4 grams of silica powder, 6 grams of $Na_2CO_3$, 10 grams of sodium metasilicate, 5 grams of sodium fluoride, and 5 grams of $Ca(OH)_2$ were mixed together. Twenty grams of this mixture was dispersed in 45 grams of water, while to two other 20 gram portions was added, respectively, 1.4 grams of dicyandiamide and 1.4 grams of urea after which each of the portions was dispersed in 45 grams of water. The working life of the aqueous adhesive compositions was determined by measuring the increase in viscosity of the samples over a period of several hours. Test results were as follows:

| Agent used | Brookfield viscosity in cp. at 6 R. P. M. | | | | | |
|---|---|---|---|---|---|---|
| | 0 | 1 Hr. | 2 Hrs. | 3 Hrs. | 4 Hrs. | 5 Hrs. |
| Control—no agent | 8,600 | 27,000 | 61,000 | 100,000 | Gelled | Gelled |
| Dicyandiamide | 4,000 | 8,000 | 11,400 | 14,000 | 19,400 | 33,600 |
| Urea | 4,200 | 10,400 | 16,000 | 23,400 | 36,600 | 62,000 |

The results show that dicyandiamide is at least twice as effective as urea in fluidifying protein adhesive compositions. In comparison with the control sample, the sample containing dicyandiamide trebled in working life.

*Example 5*

The procedure of Example 1 was repeated except that 10 grams each of ethylol dicyandiamide, isopropyl dicyandiamide, and -butyl dicyandiamide were employed as fluidifying agents instead of the dicyandiamide used in that example. Test results were as follows:

| Agent employed | Initial Brookfield Viscosity at 6 R. P. M. in cp. |
|---|---|
| Control—none | 100,000 |
| Ethylol dicyandiamide | 23,760 |
| Isopropyl dicyandiamide | 23,960 |
| N-butyl dicyandiamide | 64,960 |

*Example 6*

The procedure of Example 3 was repeated except that in the dry mixtures, 1.4 grams of isopropyl dicyandiamide and N-butyl dicyandiamide respectively were substituted for the ethylol dicyandiamide. Whereas, in the case of the control sample which contained no fluidifying agent the initial Brookfield viscosity was 14,000 centipoises, the sample containing isopropyl dicyandiamide had an initial viscosity of only 5840 centipoises and the sample containing N-butyl dicyandiamide had a viscosity of 8420 centipoises.

*Example 7*

Four adhesive compositions were prepared with alpha protein (a soya protein containing 91% protein) as follows:

| | Parts by weight | | | |
|---|---|---|---|---|
| | A¹ | B | C | D |
| Alpha protein | 66 | 66 | 66 | 66 |
| Soda ash | 7.8 | 7.8 | 7.8 | 7.8 |
| Borax | 1.8 | 1.8 | 1.8 | 1.8 |
| Dicyandiamide | 0 | 3 | 6 | 9 |
| Water | 300 | 300 | 300 | 300 |

¹ Control.

In each case the protein was soaked in 240 parts of the water until thoroughly wetted, and then the other components were added to the remainder of the water and thence to the protein dispersion. The mixture was heated with stirring for 15 minutes at 140° F. Viscosity tests with a Brookfield viscosimeter were made as follows:

| Sample | Initial viscosity in centipoises | Viscosity after 66 hours—centipoises |
|---|---|---|
| A | 1,680 | 18,800 |
| B | 960 | 12,400 |
| C | 760 | 8,000 |
| D | 440 | 1,600 |

*Example 8*

Four paper coating compositions were prepared by dispersing in 240 parts of water, in each instance, 33 parts of soya protein and allowing the protein to soak until thoroughly wetted. Thereafter, to each dispersion was added 60 parts of water containing 201 parts of English china clay, 0.1 part of sodium tetraphosphate, 3.9 parts of soda ash, and 0.9 part of borax. To three of the dispersions were added 5%, 10% and 20% respectively of dicyandiamide based on the dry weight of protein. The dispersions were heated with stirring for 15 minutes at 140° F. The coating compositions were then applied to coating base paper using a 0.001" Bird applicator, the weight of the coating being 15 pounds per ream 25"×38"—500. The coated sheets were oven-dried for 4 minutes at 220° F., and then calendered to a smooth finish. The test results were as follows:

| Per-Cent Dicyandiamide Employed | Viscosity of Coating Compositions | Paper Tests | | |
|---|---|---|---|---|
| | | Wet Rub (Taber, cycles) | Gloss (Ingersoll degrees) | Wax Pick (Dennison) |
| 0 | 1,412 | 3 | 38.1 | 7.5 |
| 5 | 1,220 | 3 | 36.7 | 7.5 |
| 10 | 896 | 3 | 36.6 | 8.0 |
| 20 | 676 | 4 | 36.4 | 8.5 |

This example clearly indicates that, while the fluidifying agent serves to decrease the viscosity of the coating composition, the presence of small amounts of the agent does not deleteriously affect the other properties of the coated paper. It will also be apparent, from this example, that we are thus enabled to prepare coating compositions characterized by improved spreading properties and also containing less water which represents a substantial saving in evaporation costs.

*Example 9*

Four dry casein adhesive mixtures were prepared as in Example 3. One sample was dispersed in water without the addition of a fluidifying agent, while to the other three samples were added, respectively, 4.2 grams each of dicyandiamide, ethylol dicyandiamide, and isopropyl dicyandiamide, and the samples were then dispersed in water as in Example 3. The initial viscosities of the aqueous dispersions were as follows:

| Sample | Brookfield viscosity centipoises at 6 R. P. M. |
|---|---|
| Control—No addition agent | 12,000 |
| Dicyandiamide | 3,400 |
| Ethylol dicyandiamide | 3,200 |
| Isopropyl dicyandiamide | 6,200 |

*Example 10*

Sixty-six grams of alpha protein (a soya protein) were soaked in 240 grams of water for 15 minutes. To the mixture was added a solution of 7.8 grams of sodium carbonate, 1.8 grams of borax, and 6.0 grams of ethylol dicyandiamide in 60 grams of water. The dispersion was then heated at 140° F. for 15 minutes with continual stirring.

A control sample was prepared similarly to the above sample except that no fluidifying agent was employed. Both samples were tested for initial Brookfield viscosity at 6 R. P. M., and after standing for 19 hours the viscosities thereof were again taken. Test results were as follows:

| Fluidifying Agent | Brookfield Viscosity Centipoises—at 6 R. P. M.— | |
|---|---|---|
| | Initial | 19 Hours |
| Control—none | 4,520 | 46,000 |
| Ethylol Dicyandiamide | 1,640 | 13,800 |

*Example 11*

Eighty-five grams of a corn protein (zein) were stirred in 400 grams of water and this mixture was allowed to stand for ½ hour, after which 8.5 grams of dicyandiamide were added thereto with stirring. Then 20 grams of ammonium hydroxide (28.4% NH₃) and 15 grams of a dry rosin size were added to the dispersion with stirring. The dispersion was then stirred for 1 hour. A control sample was made similarly to the above-described sample except that no fluidifying agent was employed. Viscosity readings were immediately taken on the samples using a Brookfield viscosimeter at 30 R. P. M. and after standing for 21 hours viscosity readings were again taken. Test results were as follows:

| Fluidifying Agent | Brookfield Viscosity Centipoises—30 R. P. M.— | |
|---|---|---|
| | Initial | 21 Hours |
| Control—none | 5,840 | 8,000 |
| Dicyandiamide | 4,960 | 6,600 |

From the foregoing description it will be seen that the present invention affords protein adhesive compositions which have greatly reduced viscosities in aqueous condition and which remain fluid and usable for longer periods of time. The aqueous adhesives may be employed according to accepted methods, as by tub or calendar application, roll, brush or knife coaters, or by other known methods with the advantages described above. Inasmuch as the initial viscosities of our novel adhesive compositions are extremely low, the content of protein which may be employed may be much greater than that which it was previously possible to employ. Similarly, since the novel protein adhesive compositions of the invention are fluid stable, waste of protein material is thus minimized, affording a long needed advantage over the prior art commercial adhesives containing casein, wheat protein, soya protein, barley protein, zein, and the like proteinaceous materials.

What we claim is:

1. An aqueous adhesive composition consisting essentially of about 5 to 35 percent by weight of an alkali-solubilized protein dispersed in about 95 to 65 percent of water together with from 5 to 30 percent, based on the dry weight of said protein, of a compound of the formula $$R.NH.\overset{NH}{\overset{\|}{C}}.NH.CN$$

in which R is a member of the group consisting of hydrogen, alkyl radicals of 1–4 carbon atoms, and monohydroxyalkyl radicals of 2–4 carbon atoms.

2. An aqueous adhesive composition consisting essentially of about 5 to 35 percent by weight of an alkali-solubilized casein dispersed in about 95 to 65 percent of water together with from 5 to 30 percent, based on the dry weight of said casein, of a compound of the formula $$R.NH.\overset{NH}{\overset{\|}{C}}.NH.CN$$

in which R is a member of the group consisting of hydrogen, alkyl radicals of 1–4 carbon atoms, and hydroxyalykl radicals of 2–4 carbon atoms.

3. A dry composition suitable for dispersion in water to form an adhesive composition containing up to about 40% of protein comprising essentially a mixture of casein, a water-soluble alkali in amount sufficient to solubilize said casein, and a fluidifying amount with the range of from 5 to 30 percent, based on the dry weight of the casein, of a compound of the formula $$R.NH.\overset{NH}{\overset{\|}{C}}.NH.CN$$

in which R is a member of the group consisting of hydrogen, alkyl radicals of 1–4 carbon atoms, and monohydroxyalkyl radicals of 2–4 carbon atoms.

4. An aqueous adhesive composition consisting essentially of about 5 to 35 percent by weight of an alkali-solubilized soya protein dispersed in about 95 to 65 percent of water together with from 5 to 30 percent, based on the dry weight of said soya protein, of a compound of the formula $$R.NH.\overset{NH}{\overset{\|}{C}}.NH.CN$$

in which R is a member of the group consisting of hydrogen, alkyl radicals of 1–4 carbon atoms, and monohydroxyalkyl radicals of 2–4 carbon atoms.

5. A dry composition suitable for dispersion in water to form an adhesive composition containing up to about 40% of protein comprising essentially a mixture of soya protein, a water-soluble alkali in amount sufficient to solubilize said soya protein, and a fluidifying amount within the range of from 5 to 30 percent, based on the dry weight of the protein, of a compound of the formula $$R.NH.\overset{NH}{\overset{\|}{C}}.NH.CN$$

in which R is a member of the group consisting of hydrogen, alkyl radicals of 1–4 carbon atoms, and monohydroxyalkyl radicals of 2-4 carbon atoms.

6. A dry composition suitable for dispersion in water to form an adhesive composition containing up to about 40% of protein comprising caesin having admixed therewith a fluidifying amount within the range of from 5 to 30 percent, based on the dry weight of the caesin, of dicyandiamide.

7. A dry composition suitable for dispersion in water to form an adhesive composition containing up to about 40% of protein comprising caesin having admixed therewith a sufficient quantity of a water-soluble alkali to solubilize said caesin and a fluidifying amount within the range of from 5 to 30 percent, based on the dry weight of the caesin, of ethylol dicyandiamide.

8. A dry composition suitable for dispersion in water to form an adhesive composition containing up to about 40% of protein comprising caesin having admixed therewith a sufficient quantity of a water-soluble alkali to solubilize said caesin, and a fluidifying amount within the range of from 5 to 30 percent, based on the dry weight of the caesin, of isopropyl dicyandiamide.

9. A dry composition suitable for dispersion in water to form an adhesive composition containing up to about 40% of protein comprising soya protein having admixed therewith a sufficient quantity of a water-soluble alkali to solubilize said soya protein, and a fluidifying amount within the range of from 5 to 30 percent, based on the dry weight of the soya protein, of dicyandiamide.

10. A dry compositon suitable for dispersion in water to form an adhesive composition containing up to about 40% of protein comprising soya protein having admixed therewith a sufficient quantity of a water-soluble alkali to solubilize said soya protein, and a fluidifying amount within the range of from 5 to 30 percent, based on the dry weight of the soya protein, of ethylol dicyandiamide.

11. A dry composition suitable for dispersion in water to form an adhesive composition containing up to about 40% of protein comprising soya protein having admixed therewith a sufficient quantity of a water-soluble alkali to solubilize said soya protein, and a fluidifying amount within the range of from 5 to 30 percent, based on the dry weight of the soya protein, of isopropyl dicyandiamide.

CHESTER G. LANDES.
JOHN STUDENY.

REFERENCES CITED

The following references are of record in the file of this patent:

UNITED STATES PATENTS

| Number | Name | Date |
|---|---|---|
| 1,886,750 | Shisler | Nov. 8, 1932 |
| 1,952,941 | Ripper | Mar. 27, 1934 |
| 2,482,879 | Schmutzler | Sept. 27, 1949 |

FOREIGN PATENTS

| Number | Country | Date |
|---|---|---|
| 115,770 | Australia | Sept. 3, 1942 |